No. 783,585.

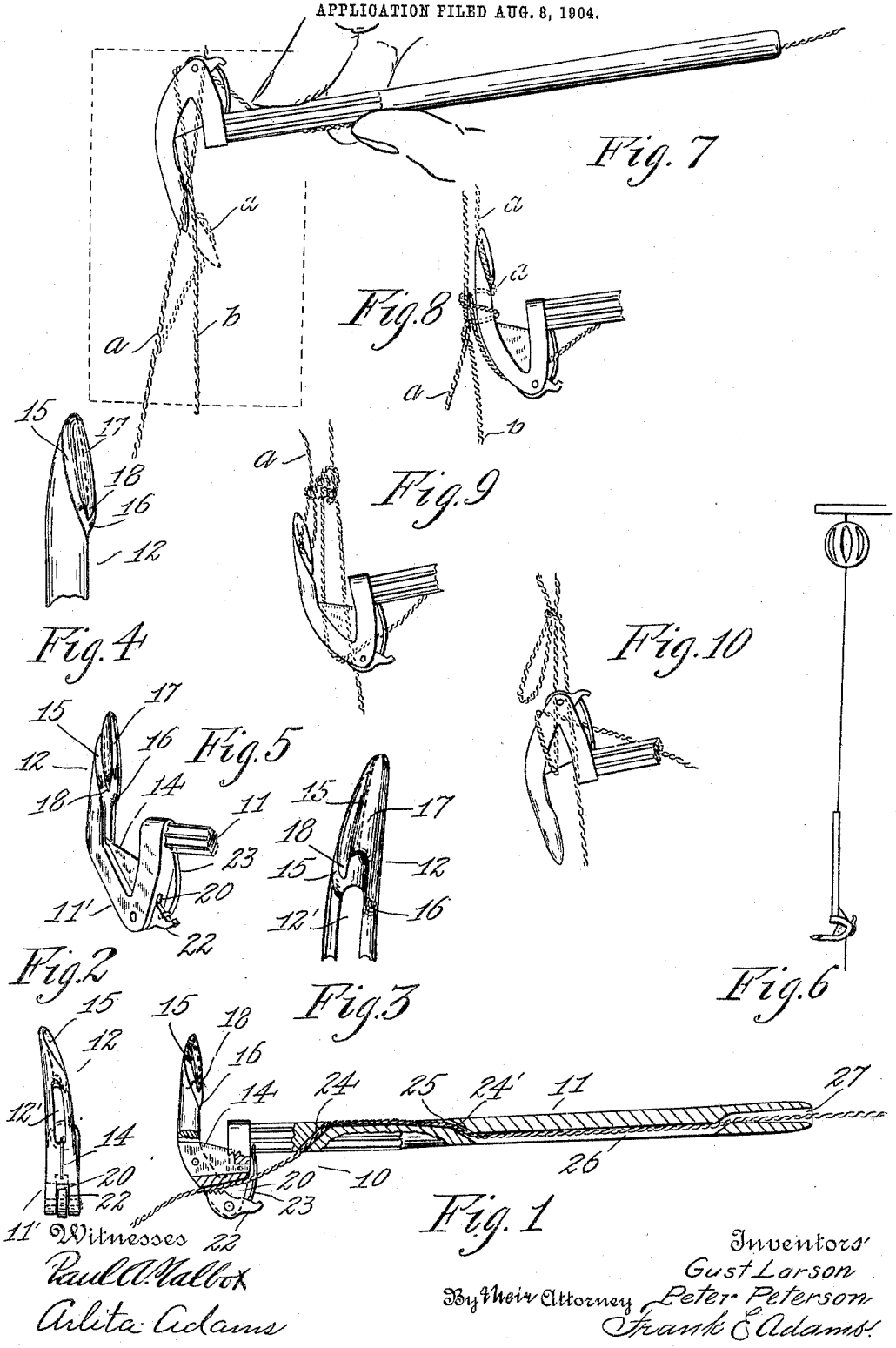

Patented February 28, 1905.

UNITED STATES PATENT OFFICE.

GUST LARSON AND PETER PETERSON, OF SPOKANE, WASHINGTON.

IMPLEMENT FOR FACILITATING THE APPLICATION OF WRAPPING-CORD TO PACKAGES.

SPECIFICATION forming part of Letters Patent No. 783,585, dated February 28, 1905.

Application filed August 8, 1904. Serial No. 220,043.

*To all whom it may concern:*

Be it known that we, GUST LARSON and PETER PETERSON, citizens of the United States of America, and residents of the city of Spokane, in the county of Spokane and State of Washington, have invented certain new and useful Improvements in Implements for Facilitating the Application of Wrapping-Cord to Packages, of which the following is a specification.

Our invention relates to an implement adapted to facilitate the placing, tying, and severing of cord in binding packages, and has for its objects to provide a simple and inexpensive hand device of the above nature embodying essential features of adaptability, utility, and general efficiency which facilitates the placing of cord about the package and expedites the tying thereof and the severance of the portion used from the supply.

The above-mentioned and other desirable objects are attained by the construction, combination, and arrangement of parts, as disclosed on the accompanying drawings, set forth in this specification, and succinctly pointed out in the appended claims.

With reference to the drawings filed herewith and bearing like reference characters for corresponding parts throughout, Figure 1 is a side view of the implement in partial section, showing a cord threaded therein. Fig. 2 is an end view of the implement looking at the back of the bill. Fig. 3 is a front view of a portion of the bill of the implement on large scale. Fig. 4 is a side view of a portion of the bill on large scale. Fig. 5 is a fragmentary perspective view of the implement. Fig. 6 is a perspective view, on small scale, showing the implement engaged with a supply of cord; and Figs. 7, 8, 9, and 10 illustrate the manner of manipulating the implement in tying and severing the cord.

Our invention embraces a handle, as 10, having a hand part 11 and an approximately V-shaped head 11' connected adjacent the end of one stem with said part, a bill 12 connected with the other stem of the head and projecting substantially at right angles to the axis of the hand part, and a cutter 14 arranged in the crotch or notch of the head of said handle.

The bill 12 is inclined to one side, being inclined to the left as viewed in Fig. 2, and in the base end portion thereof is an elongated opening 12', which extends from the back to the front of the bill and is adapted to reduce the weight of the implement. The free end portion of the bill is tapered outwardly from the base portion to a blunt point, the inclination of the side surface of this end portion opposite to the side toward which the bill is inclined being the greater, so as to bring said point to the opposite side of the bill, and thereby insure the cord against slipping therefrom in the primary step of tying the knot, as will be later understood. In this side surface of the bill is a groove 15, which is adapted to receive the cord in forming the bow of the knot, and which groove commences at the back of the bill, adjacent the point thereof, and extends obliquely across the said side surface to a point adjacent the base of the tapered portion of the bill, and adjacent the base end of this groove a rounded shoulder 16 is formed on the front surface of the bill at the opposite side edge thereof from the groove to keep the cord from slipping outwardly as it is laid in the groove. In the front surface of the bill is a longitudinally-disposed groove 17, adapted to receive a portion of the cord when drawing the bow through the loop of the knot, and which groove extends from the point of the bill to the base end of the diagonal groove 15 and intersects therewith, leaving a ridge between said grooves which extends into a finger 18 at said point of intersection, the said finger being formed by undercutting the ridge at this point and being adapted to catch the cord as it slips outwardly on the bill from shoulder 16 in withdrawing the bill from the loop of the knot, and thereby form the bow.

The head 11' is formed with a groove 20 at the apex for slidably engaging the cord, the said groove extending parallel to the axis of the hand part of the handle and having the bottom inclined downwardly toward the same, and in the stems of this head are opposite slits of suitable width to receive the cutter 14, which consists of a substantially broad blade seated in said slits and formed with the cutting edge inclined downwardly toward the handle. Mounted in the groove 20 is a spring-pressed catch 22, which is adapted to prevent the implement from slipping outwardly on the cord, being suitably pressed by a spring, as 23, to clamp the cord against the bottom of said slot and having a thumb-piece projecting toward the handle of the implement, by means of which the operator can raise the catch when desired to give free clearance to the cord, as in drawing the bow through the loop in tying the knot.

The hand part 11 of the handle is somewhat longer than the width of the hand and is preferably round as viewed in cross-section and formed with longitudinally-extending ridges on the head end portion, which insure a better grip of the thumb and forefinger to rotate the implement as required in tying the knot. In this head end portion is an eye for the cord consisting of an aperture 24, extending diagonally from a point adjacent the groove 20 toward the rear end of the handle, and adjacent said aperture is a second eye or aperture 24', oppositely inclined to the first. Connecting with these apertures and extending between the ends thereof which lie closest together is a shallow groove 25 for the cord, which is formed longitudinally in the periphery of the hand part, and a longitudinal channel 26 of considerable depth is formed in the periphery of said part at the opposite side from said groove and extends rearwardly from the aperture 24' and communicates with a longitudinally-disposed eye or aperture 27, formed in the rear end portion of the handle.

The cord is threaded in the implement by passing the cord through the eyes 27, 24', and 24 and along the groove 20 under the catch 22. Thus the cord will lie in the channel 26 free of the hand, and where it passes along groove 25 and between eye 24 and groove 20 it will be exposed so that it can be pressed against the hand part by application of the finger to place it under tension, as desired in wrapping the cord about the package and in tying the knot.

To use the implement in tying up a package, the handle is grasped in one hand with the forefinger over the cord where it passes from eye 24 to groove 20, the thumb on the opposite side between eyes 24 and 24' and the bill of the implement pointing toward the user. The end portion $a$ of the cord beyond the head of the implement is grasped and held in the other hand during the entire operation and the implement is carried first from the operator over and about the package the desired number of times, the cord during this operation passing freely beneath the catch 22, (see Fig. 1,) and the forefinger and thumb of the hand holding the implement are brought into play to press the outgoing cord against the hand part, and thereby regulate the tension so that the cord can be taut about the package.

In tying the cord the implement is held substantially horizontal just above the package with the bill pointing toward the operator and the portion $b$ of the cord that leads directly from the head passing beneath the same and crossing over the free end portion $a$ between the face of the bill and the handle, (see Fig. 7,) the said free end portion beyond the crossing being held over the point of the bill. The point of the bill is then slipped beneath the portion $b$ of the cord to take up the portion which forms the loop for the bow, and the end portion $a$ is then placed under the point of the bill and crossed over the portion $b$ at the back of said bill. (See broken lines in Fig. 7.) The implement is now given a half-rotation by turning the point of the bill downwardly and away from the operator to the position shown in Fig. 8, and the end portion $a$ of the cord is then swung upwardly and away from the operator and passed beneath the bill and brought against the front thereof just below shoulder 16 and then carried diagonally across the upper side of the bill in groove 15. (See broken lines in Fig. 8.) The thumb is now placed on the thumb-piece of catch 22 to open same, and the implement is drawn toward the operator to disengage the bill from the loop and draw a part of the end portion $a$ therethrough to form the bow, (see Fig. 9,) said portion being caught by finger 18, but sliding therebeneath and the part thereof which is beneath the bill seeking the groove 17 in advance of the loop as it slips from the bill.

In withdrawing the bill the resistance to the sliding of the portion $a$ of the cord beneath the finger as the bow is formed will close the knot, after which the implement is given a half-rotation from the position indicated in Fig. 9 to the position indicated in Fig. 10, turning the point of the bill downwardly, thus allowing the bow to slip from beneath finger 18 and bringing the portion of the cord which is between the implement and the knot across the edge of the cutter, as in Fig. 10, when a slight jerk of the implement toward the operator will sever the cord, leaving an end portion of the supply protruding from the head of the implement.

It requires but little practice with the implement to perform the above-described operation of tying a knot, and when the cord is thus tied it will be securely fastened, though it can be readily untied by pulling upon the free end of the bow.

The instrument is durable in use and simple and inexpensive in construction, and by its use the placing and tying of cord or the like about packages or parcels is greatly facilitated. Furthermore, after threading the cord through the implement it can be used continuously without rethreading until the supply of cord is exhausted.

In the foregoing description we have set forth the manner of manipulating the implement in forming one kind of a knot; but we do not wish to so limit the use of the implement, as it may be used in making different kinds of knots.

Having thus described our invention, what we claim as new, and desire to secure by Letters Patent of the United States of America, is—

1. An implement of the character set forth comprising a handle provided with means for guiding a cord, and a bill arranged at an angle to the axis of said handle and having a finger pointing toward the base end of said bill.

2. An implement of the character set forth comprising a handle provided with means for guiding a cord, a catch for gripping the cord, and a bill having a finger.

3. An implement of the character set forth comprising a handle adapted to be rotated in the hand, said handle being provided with means for guiding a cord, and a bill arranged substantially at right angles to the axis of said handle and having a finger pointing toward the base end of said bill.

4. An implement of the character set forth comprising a handle adapted to be rotated in the hand and having a head provided with means for slidably engaging a cord, a bill on said head arranged substantially at right angles to the axis of said handle and having a finger pointing toward the base end of said bill, and a cutter intermediate said means and said finger.

5. An implement of the character set forth comprising a handle adapted for rotation in the hand and provided with means for guiding a cord, and a bill arranged substantially at right angles to the axis of said handle and having a finger.

6. An implement of the character set forth comprising a handle adapted for rotation in the hand, a bill arranged at an angle to the axis of said handle and having a finger pointing toward the base end of said bill, and a cutter opposite the point of said finger, projecting outwardly beyond the bill.

7. An implement of the character set forth comprising a handle, and a bill arranged substantially at right angles to the axis of said handle and provided with intersecting grooves diverging toward the point of said bill, and a finger at said intersection pointing toward the base end of said bill.

8. An implement of the character set forth comprising a handle having a head provided with means for guiding a cord, a catch for gripping said cord, a bill on said head arranged at an angle to said handle and having a finger pointing toward the base end of said bill, and a cutter intermediate said means and said finger.

9. An implement of the character set forth comprising a handle having a laterally-projecting head provided with a notch and with means for slidably engaging a cord, a bill on said head extending in the opposite direction from said notch and having a finger pointing toward the base end of said bill, and a cutter arranged in said notch intermediate said means and said finger.

10. An implement of the character set forth comprising a handle having an approximately V-shaped head connected thereto by one of its stems and provided with a groove at the apex, a bill connected to the other stem of said head and having a finger pointing toward the base end of said bill, a spring-pressed catch mounted in said groove, and a cutter arranged in the crotch of said head.

11. An implement of the character set forth comprising a handle provided with means for slidably engaging a cord, a bill arranged substantially at right angles to the axis of said handle and provided with an inclined groove in one side, a shoulder on the bill adjacent the base end of said groove, and a finger at said end of the groove.

12. An implement of the character set forth comprising a handle, a bill arranged substantially at right angles to the axis of said handle and provided with a longitudinal groove in the front surface and an inclined groove in one side surface intersecting said first groove, a shoulder on said front surface adjacent said intersection, and a finger at said intersection pointing toward the base of said bill.

13. An implement of the character set forth comprising a handle having a head provided with means for slidably engaging a cord, a bill arranged substantially at right angles to the axis of said handle and provided with a longitudinal groove in the front surface and an inclined groove in one side surface intersecting said first groove, a shoulder on said front surface adjacent said intersection, a finger at said intersection pointing toward the base of said bill, and a cutter intermediate said means and said finger.

14. An implement of the character set forth comprising a handle consisting of a hand part provided with eyes to receive a cord and having a head provided with means for slidably engaging said cord, a bill arranged on said head substantially at right angles to the axis of said part and having a finger pointing toward the base end of said bill, and a cutter intermediate said engaging means and said finger.

15. An implement of the character set forth comprising a handle consisting of a hand part provided with a plurality of eye-apertures adjacent one end, and a laterally-projecting head at said end provided with a groove extending parallel to the axis of said part, a spring-pressed catch arranged in said groove, a bill arranged on said head substantially at right angles to said axis and having a finger pointing toward the base end of said bill, and a cutter intermediate said groove and said finger.

16. An implement of the character set forth comprising a handle consisting of a hand part provided with a plurality of eye-apertures adjacent one end, and an approximately V-shaped head connected by one stem with said part and provided with a groove in the apex, a spring-pressed catch arranged in said groove, a bill connected with the other stem of said head and having a finger pointing toward the base end of said bill, and a cutter arranged in the crotch of said head.

17. An implement of the type set forth comprising a handle, and a bill arranged at an angle thereto, said bill having its point disposed at one side of its body portion.

18. In an implement of the type set forth, a handle provided with a cord-guiding means including a groove, and a cord-gripping means mounted in said groove.

19. An implement of the type set forth provided with a hand part having longitudinal means formed therein to guide a cord with a portion of the cord exposed between the ends of said hand part.

20. An implement of the character set forth comprising a handle, and a bill secured thereto, said bill being formed with intersecting grooves diverging toward its point, and a finger at said intersection pointing toward the base end of said bill.

Signed at Spokane, Washington.

GUST LARSON.
PETER PETERSON.

Witnesses:
R. W. NUZUM,
FLORENCE E. COFFEEN.